US011196643B2

(12) United States Patent
Bruun et al.

(10) Patent No.: US 11,196,643 B2
(45) Date of Patent: Dec. 7, 2021

(54) STATE TRANSITIONS FOR A SET OF SERVICES

(71) Applicant: HEWLETT PACKARD ENTERPRISE DEVELOPMENT LP, Houston, TX (US)

(72) Inventors: Peter Michael Bruun, Alleroed (DK); Mads Stenhuus, Alleroed (DK); Henrik Stig Langli, Alleroed (DK)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/945,132

(22) Filed: Apr. 4, 2018

(65) Prior Publication Data

US 2019/0312794 A1 Oct. 10, 2019

(51) Int. Cl.

| | |
|---|---|
| ***H04L 12/24*** | (2006.01) |
| ***H04L 29/08*** | (2006.01) |
| ***G06F 9/48*** | (2006.01) |
| ***G06F 9/50*** | (2006.01) |
| *G06F 16/901* | (2019.01) |

(52) U.S. Cl.

CPC .......... *H04L 41/5054* (2013.01); *G06F 9/485* (2013.01); *G06F 9/5077* (2013.01); *H04L 41/044* (2013.01); *H04L 41/12* (2013.01); *H04L 67/10* (2013.01); *H04L 67/16* (2013.01); *G06F 16/9024* (2019.01)

(58) Field of Classification Search

CPC ............. H04L 41/0843; H04L 41/5045; H04L 41/5054

See application file for complete search history.

(56) References Cited

U.S. PATENT DOCUMENTS

| | | | |
|---|---|---|---|
| 7,111,299 B2 | 9/2006 | Tran et al. | |
| 7,950,007 B2 | 5/2011 | Mohindra et al. | |
| 8,191,043 B2 | 5/2012 | Mohindra et al. | |
| 8,245,122 B2 | 8/2012 | Liu et al. | |

(Continued)

FOREIGN PATENT DOCUMENTS

| | | |
|---|---|---|
| CN | 1942860 A | 4/2007 |
| CN | 101933000 A | 12/2010 |

(Continued)

OTHER PUBLICATIONS

Office Action received for European Patent Application No. 14790011.2, dated Apr. 10, 2018, 5 pages.

(Continued)

*Primary Examiner* — Shean Tokuta

(74) *Attorney, Agent, or Firm* — Hewlett Packard Enterprise Patent Department

(57) ABSTRACT

Examples herein relate to developing an orchestration plan. Examples disclose the development of a representation of a set of services wherein each service relates to other services via different types of relationships. The examples apply a set of dependency rules for each type of relationship at each service within the set of services such that the application of the set of dependency rules creates inter-service dependencies between state transitions of the set of services. Based on the creation of the inter-service dependencies, the orchestration plan is developed which includes a sequenced order of the state transitions for the set of services.

18 Claims, 9 Drawing Sheets

(56) References Cited

U.S. PATENT DOCUMENTS

| | | | | |
|---|---|---|---|---|
| 8,301,755 | B2 | 10/2012 | De et al. | |
| 8,418,002 | B2 | 4/2013 | Lazzaro | |
| 8,863,137 | B2 | 10/2014 | Keller et al. | |
| 8,880,591 | B2 | 11/2014 | Feldman et al. | |
| 8,914,499 | B2 | 12/2014 | Houlihan et al. | |
| 8,954,418 | B2 | 2/2015 | Faerber et al. | |
| 9,286,106 | B1 | 3/2016 | Huang | |
| 9,367,374 | B2 | 6/2016 | Kaus et al. | |
| 9,378,120 | B2 | 6/2016 | Chakraborty et al. | |
| 9,430,262 | B1 | 8/2016 | Felstaine et al. | |
| 9,594,601 | B2 | 3/2017 | Shau et al. | |
| 9,998,562 | B1 | 6/2018 | Peterson et al. | |
| 10,178,027 | B2 | 1/2019 | Johnsen et al. | |
| 10,275,258 | B2 * | 4/2019 | Zellermayer | G06F 9/4401 |
| 10,326,845 | B1 * | 6/2019 | Jaeger | H04L 41/0806 |
| 10,348,857 | B2 | 7/2019 | De et al. | |
| 10,419,524 | B2 * | 9/2019 | Schincariol | G06F 9/5072 |
| 10,454,771 | B2 | 10/2019 | Ellis et al. | |
| 10,594,621 | B2 | 3/2020 | Sharma et al. | |
| 10,785,128 | B1 | 9/2020 | Bawcom | |
| 2004/0260602 | A1 | 12/2004 | Nakaminami et al. | |
| 2005/0086562 | A1 | 4/2005 | Demsky et al. | |
| 2005/0155042 | A1 | 7/2005 | Kolb et al. | |
| 2005/0240354 | A1 | 10/2005 | Mamou et al. | |
| 2006/0029054 | A1 | 2/2006 | Breh et al. | |
| 2006/0256733 | A1 | 11/2006 | Bejerano | |
| 2006/0268742 | A1 | 11/2006 | Chu et al. | |
| 2007/0043803 | A1 | 2/2007 | Whitehouse et al. | |
| 2007/0294668 | A1 | 12/2007 | Mohindra et al. | |
| 2008/0294777 | A1 * | 11/2008 | Karve | G06F 8/60 709/226 |
| 2009/0157723 | A1 | 6/2009 | De et al. | |
| 2009/0193439 | A1 | 7/2009 | Bernebeu-Auban et al. | |
| 2009/0327216 | A1 | 12/2009 | Brown et al. | |
| 2010/0057780 | A1 | 3/2010 | Isobe et al. | |
| 2010/0333109 | A1 | 12/2010 | Milnor | |
| 2011/0046992 | A1 | 2/2011 | Erhard | |
| 2011/0145657 | A1 | 6/2011 | Bishop et al. | |
| 2011/0276444 | A1 | 11/2011 | Toernkvist | |
| 2012/0016713 | A1 | 1/2012 | Wilcock et al. | |
| 2012/0089726 | A1 | 4/2012 | Doddavula | |
| 2012/0117226 | A1 | 5/2012 | Tanaka et al. | |
| 2013/0036425 | A1 | 2/2013 | Zimmermann | |
| 2013/0127891 | A1 * | 5/2013 | Kim | G06T 11/60 345/582 |
| 2013/0151317 | A1 * | 6/2013 | Charfi | G06Q 30/0241 705/7.36 |
| 2013/0198760 | A1 | 8/2013 | Cuadra et al. | |
| 2013/0217361 | A1 * | 8/2013 | Mohammed | H04M 15/77 455/411 |
| 2013/0290937 | A1 | 10/2013 | Joukov et al. | |
| 2014/0013315 | A1 * | 1/2014 | Genevski | G06F 8/60 717/170 |
| 2014/0074905 | A1 * | 3/2014 | Schincariol | G06F 9/5072 709/201 |
| 2014/0075048 | A1 | 3/2014 | Yuksel et al. | |
| 2014/0098673 | A1 | 4/2014 | Lee et al. | |
| 2014/0172944 | A1 | 6/2014 | Newton et al. | |
| 2014/0229945 | A1 | 8/2014 | Barkai et al. | |
| 2014/0278662 | A1 | 9/2014 | Reed et al. | |
| 2015/0006733 | A1 | 1/2015 | Khan et al. | |
| 2015/0120380 | A1 | 4/2015 | Deshpande et al. | |
| 2015/0124645 | A1 | 5/2015 | Yadav et al. | |
| 2015/0278395 | A1 | 10/2015 | Ben et al. | |
| 2015/0309780 | A1 * | 10/2015 | Ruehl | H04L 67/1095 717/176 |
| 2015/0365322 | A1 | 12/2015 | Shatzkamer et al. | |
| 2015/0378774 | A1 | 12/2015 | Vermeulen | |
| 2016/0080422 | A1 | 3/2016 | Belgodere et al. | |
| 2016/0094477 | A1 * | 3/2016 | Bai | H04L 47/786 709/226 |
| 2016/0378450 | A1 | 12/2016 | Fu et al. | |
| 2017/0161104 | A1 * | 6/2017 | Johnson | G06Q 10/063 |
| 2017/0161129 | A1 * | 6/2017 | Johnson | G06F 11/0751 |
| 2017/0207968 | A1 * | 7/2017 | Eicken | H04L 41/0843 |
| 2017/0257432 | A1 | 9/2017 | Fu et al. | |
| 2017/0270214 | A1 | 9/2017 | Narasimhan et al. | |
| 2017/0289060 | A1 * | 10/2017 | Aftab | H04L 41/5054 |
| 2017/0322954 | A1 * | 11/2017 | Horowitz | G06F 16/2228 |
| 2017/0366623 | A1 | 12/2017 | Shi et al. | |
| 2018/0083828 | A1 * | 3/2018 | Cartaya | H04L 41/12 |
| 2018/0107186 | A1 | 4/2018 | Brown et al. | |
| 2018/0145884 | A1 * | 5/2018 | Stefanov | H04L 41/5048 |
| 2018/0157472 | A1 * | 6/2018 | Chen | H04L 41/0806 |
| 2018/0165071 | A1 * | 6/2018 | Raghavan | G06F 8/60 |
| 2018/0246755 | A1 | 8/2018 | Ailamaki et al. | |
| 2018/0359162 | A1 * | 12/2018 | Savov | H04L 41/5054 |
| 2019/0058638 | A1 * | 2/2019 | Ahuja | H04L 45/38 |
| 2019/0068440 | A1 * | 2/2019 | Nelson | G06F 9/5077 |

FOREIGN PATENT DOCUMENTS

| | | | | |
|---|---|---|---|---|
| CN | 102138315 | A | 7/2011 | |
| CN | 103516781 | A | 1/2014 | |
| CN | 104901998 | A | 9/2015 | |
| CN | 105164660 | A | 12/2015 | |
| WO | 2007/146368 | A2 | 12/2007 | |
| WO | 2008/091663 | A1 | 7/2008 | |
| WO | 2015/032435 | A1 | 3/2015 | |
| WO | WO-2017129248 | A1 * | 8/2017 | G06F 9/5077 |

OTHER PUBLICATIONS

Office Action received for European Patent Application No. 14790011.2 , dated Aug. 3, 2018, 4 pages.

Kelly et al., "Output-Valid Rollback-Recovery", HP Labs, HPL-2010-155, 2010, pp. 1-14.

International Searching Authority, "Notification of Transmittal of the International Serach Report and the Written Opinion", PCT/EP2014/070838, dated Jun. 15, 2015, 12 pages.

International Search Report and Written Opinion received for PCT Patent Application No. PCT/EP2016/051851, dated Oct. 10, 2016, 10 pages.

International Preliminary Report on Patentabilityreceived for PCT Application No. PCT/EP2014/070838, dated Apr. 13, 2017, 10 pages.

International Preliminary Report on Patentability received for PCT Patent Application No. PCT/EP2016/051851, dated Aug. 9, 2018, 8 pages.

Intel, "End-To-End NFV vEPC Service Orchestration of a Virtual EPC Network Function Virtualization Use Case on Intel Architecture", Intel Network Builders Reference Architecture Retreived on Mar. 26, 2017, 24 pages.

Ferry et al., "A Real-time Scheduling Service for Parallel Tasks", IEEE 19th Real-Time and Embedded Technology and Applications Symposium (RTAS), Apr. 2013, 11 pages.

Fdhila Walid et al., "On Evolving Partitioned Web Service Orchestrations," IEEE International Conference on Service-Oriented Computing and Applications, Dec. 2012, pp. 1-7.

Clayman, et al., "The Dynamic Placement of Virtual Network Functions", Telecom Italia Strategy Future Centre. Via Reiss Romoli 274, 10148 Turin, Italy. IEEE 2014, 9 pages.

Cerrato, et al., "User-Specific Network Service Functions in an SDN-Enabled Network Node", Deptment of Computer and Control Engineering. Politecnico di Torino. Torino, Italy, 2014, 2 pages.

Xiao et al., "Process Dependencies and Process Interference Rules for Analyzing the Impact of Failure in a Service Composition Environment", Proceedings of the 10th international conference on Business information systems, 2007, pp. 67-81.

Laurent et al., "Planning for Declarative Processes", The 29th Annual ACM Symposium on Applied Computing, 2014, pp. 1126-1133.

Bohm et al., "Processes Are Data: a Programming Model for Distributed Applications", Web Information Systems Engineering—WISE 2009, 12 Pages.

Oracle, "4 Understanding Orchestration," Oracle® Communications Order and Service Management Concepts, 2009, pp. 1-55,

(56) References Cited

OTHER PUBLICATIONS

Release 7.2.2, Retrieved from the Internet on Nov. 24, 2017 at URL: <docs.oracle.com/cd/E35413_01/doc.722/e35415/cpt_orchestration.htm#autoId0>.
Casati et al., "eFlow: A Platform for Developing and Managing Composite E-Services", Proceedings Academia/Industry Working Conference on Research Challenges, 2000, pp. 341-348.
Yang et al., "Research on Software Architecture-based Composition of Internetware", May 15, 2007, 3 pages.

* cited by examiner

STATE TRANSITIONS FOR A SET OF SERVICES

BACKGROUND

Uses of orchestration may be discussed in the context of service-oriented architecture, virtualization, provisioning, converged infrastructure, telecommunications, and datacenter topics. Orchestration defines policies and service levels through automated workflows, provisioning, and change management. As such, orchestration provides centralized management of a resource pool and may include, for example, billing, metering, and chargeback for consumption. As the requirement for new resources increases with an introduction of new applications, automated tools by way of orchestration can perform tasks previously handled by multiple administrators operating on their individuals pieces of the physical stack.

BRIEF DESCRIPTION OF THE DRAWINGS

In the accompanying drawings, like numerals refer to like components or blocks. Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
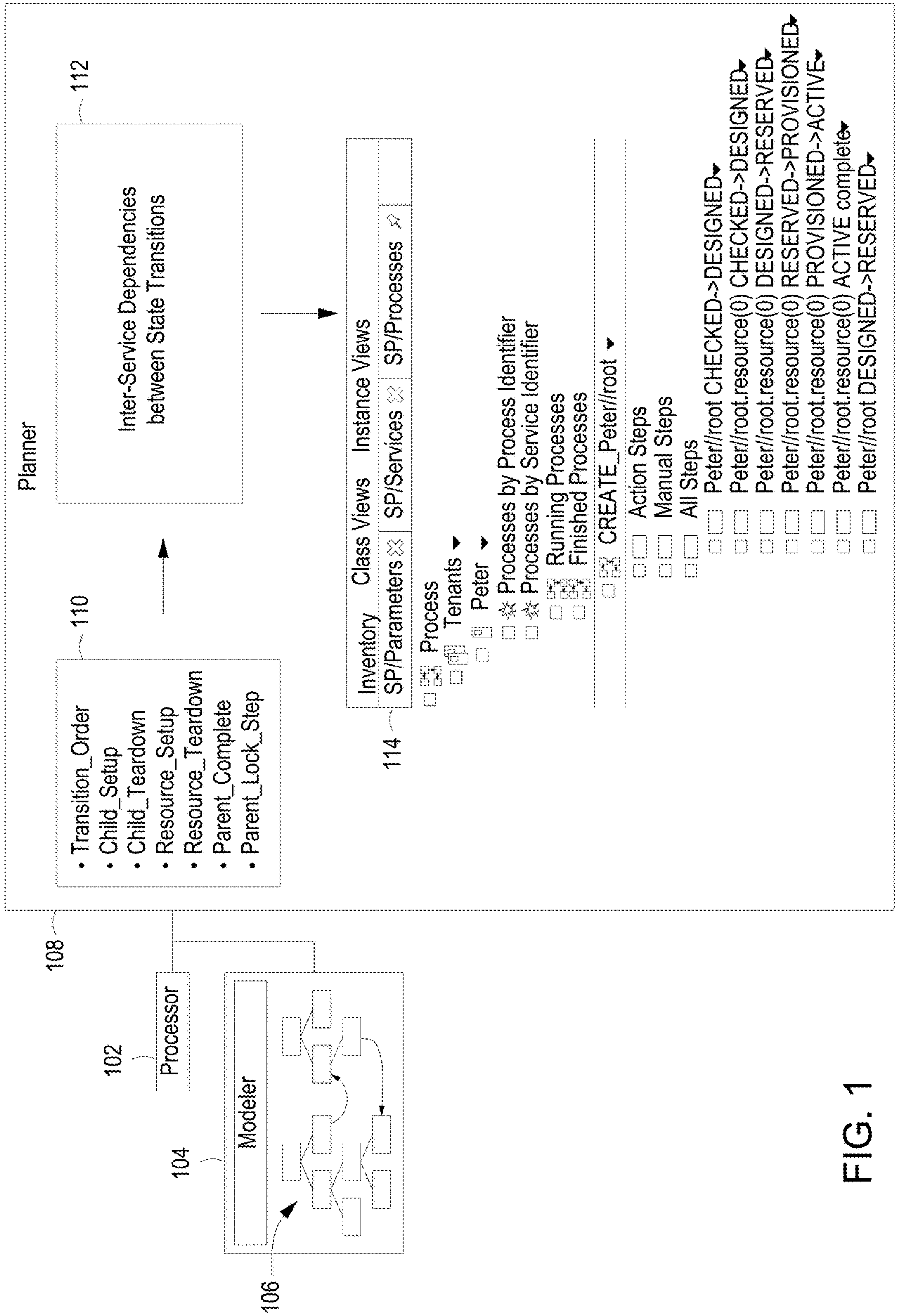
FIG. 1 is a system to develop an orchestration plan in accordance with the present disclosure.

Uses of orchestration may be discussed in the context of service-oriented architecture, virtualization, provisioning, converged infrastructure, telecommunications, and datacenter topics. Orchestration defines policies and service levels through automated workflows, provisioning, and change management. As such, orchestration provides centralized management of a resource pool including billing, metering, and chargeback for consumption. As the requirement for new resources increases with an introduction of new applications, automated tools by way of orchestration can perform tasks previously handled by multiple administrators operating on their individuals pieces of the physical stack.

Orchestration means executing a number of actions on a number of entities represented as services in a service model. Service models can be simple, such as a decomposition model, or complex as a general graph with different types of service relationships. Furthermore, each service in the model can be governed by a state model that again can be simplistic as in "Nonexistent" or "Active" or complex, consisting of many states and state-transitions. An orchestration plan includes a sequence of state transition actions in such a way that the actions respect constraints on the order of execution. The constraints are derived from among other things a state transition model and the different relationship types in the service model. These constraints can be represented as a graph of dependencies between state-transitions in the services. Serializing dependency graph models have been solved for simplistic decomposition models and for state-less models; however for more complex graph models, solutions are limited in solving all possible model transformations.

"Services" as explained herein, refers to the entities or groups of entities that represent objects of orchestration of changes in a complex system consisting of interactive services, networks, and systems for the creation of for example communication services.

One solution uses ad-hoc decomposition methods and queue-based execution plans. For example, machine code executable by a processor may push actions queues in an order intended to generate the correct sequence of actions. This solution results in unpredictable behavior and may be unable to handle complex uses cases. For example, using decomposition methods and queue-based executions are limiting when going through state-transitions that effectively tear down and re-create parts of a configuration topology. Additionally, ad-hoc approaches may be unable to detect conflicting requirements which may lead execution engines to make unpredictable arbitration decisions. Unpredictable arbitration decisions result in an unstable end-to-end orchestration solution as the solution becomes untestable.

A second solution uses models declared as graph templates, referred to as the Topology and Orchestration Specification for Cloud Applications (TOSCA) Organization for the Advancement of Structured Information Standards (OASIS) standard language. In the TOSCA OASIS solution, standard language is used to describe a topology of for example cloud based web services, their components, relationships, and the processes that manage the web services. The resulting models in this solution are static and may not be modified. Modifications to the resulting models institute a tear-down and recreation of the full model and components. This solution becomes a challenge in the situations where downtime is undesirable.

A third solution uses services that are defined by hierarchical decomposition which is another type of a simplified model. In the hierarchical decomposition, a hierarchical decision process is used to evaluate a sequence of actions; however, this solution is inherently unable to capture graph structured services, as modifications to the hierarchy structure would elicit a redesign of the full structure. In this example, the hierarchical decomposition solution is more of a static approach and would be unable to handle changes that span the hierarchy without a full redesign. In another example of the hierarchical decomposition, a tree model may be used in which each node in the structure may include a parent node and/or parent node. From a modeling perspective, tree structures are much more simplistic and fail to account for the more difficult and complex models that include various interdependencies between the nodes and/or that the nodes may have no commonality among each other.

Yet, in a fourth solution uses a simplistic state-model in which the various states of a service are interdependent on one another in the model. In this solution, a node represented in the state as fully configured or non-existent. This approach reduces the problem of modeling the dependencies between states of related notes in the graph; however, the approach is unable to handle the complex modeling scenarios.

As explained in detail, solutions directed to planning an order of execution steps based on complex dependent models are inadequate. As such, the present disclosure claims a planner that formalizes different types of dependencies handling the complex re-creation scenarios and the ability to detect and report inconsistent requirements. Detections and reporting the inconsistent requirements allows a designer to modify the model so that the models becomes predictable, consistent, and testable. The planner works on complex dependency graphs with complex, state-based relationships between the graph nodes. Additionally, the planner is able to scale in and out service models that consists of many graphs objects.

The present disclosure develops a representation of a set of services such that the representation includes how the set of services relate to one another by different types of relationships. Based on the representation, a set of dependency rules is applied for each type of relationship in the representation. In response to the application of the set of dependency rules, inter-service dependencies are created between state transitions for the set of services. From the inter-service dependencies, an orchestration plan may be developed. The orchestration plan translates the sequenced order of actions that bring the system back to a consistent state. This provides an automated creations of the orchestration plan so that in the event that there is a modification to one of the relationships and/or state transitions, the system reacts to keep the system in the consistent state. Keeping the system in the consistent state allows critical services to continue without interruption.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible, and indeed desirable as the ability to handle model complexity that evolves with time is another one of the advantages of the disclosure. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms “a,” “an,” and “the” are intended to include the plural forms as well, unless the context clearly indicates otherwise. The term “multiple,” as used herein, is defined as two, or more than two. The term “another,” as used herein, is defined as at least a second or more. The term “coupled,” as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term “and/or” as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term “includes” means includes but not limited to, the term “including” means including but not limited to. The term “based on” means based at least in part on. Additionally, the term “services” as explained herein, refers to the orchestration of changes in a complex system consisting of interactive services, networks, and systems for the creation of communication services.

A “list”, also referred to as a “sequence” is a mapping from each of the numbers from 1 to some natural number, n. An empty list is an empty mapping. The size of the list is the largest number, n or 0 for the empty list. The number mapped to a given value is referred to as the “index” of that value. In computer software, the indexes of lists are often the numbers from 0 to n-1 instead of 1 to n.

A “relationship” is defined by means of a type of reference between elements of a set, the domain, and elements of another set, the range. The range may in some cases be the same set as the domain. In this context, the sets are of finite size, infinite sets are not relevant. Many elements in the domain may reference the same element in the range, so a single reference type defines a “many-to-one” relationship between the elements of the domain and the elements of the range. If there are two different types of reference from the same domain, then the domain and the two reference types define a “many-to-many” relationship between the two ranges. If there are n reference types, the domain and reference types form a “n-ary relationship” between the n ranges. Relational Database Management Systems, known as RDBMS, are based on the principles of such relationships and reference types. It is a theorem of the theory of relational databases, that any n-ary relationship can be decomposed into binary and 3-ary relationships.

A “directed graph” over a set, S, can be defined by a binary relationship where the ranges of the two reference types are both the set S. The elements of S may be subdivided into different element types. The elements of the domain of the two references represent arrows from the first reference type, the source, and the second reference type, the target. The elements of a directed graph are sometimes also referred to as “vertices” and the arrows as “arcs”. A “path” starting from E1 and ending with En in a directed graph is defined as a list of one or more arrows, such that E1 is the source of the first arrow in the list, En is the target of the last arrow in the list, and the source of any arrow except the first is the target of the previous arrow in the list. A “cycle” in a directed graph is a path that starts and ends with the same element. A “cyclic directed graph” is a directed graph where there exists one or more cycles. If a directed graph has no cycles, it is called a “directed acyclic graph”, in the literature known as a “DAG”.

A “tree” is a DAG where there is precisely one element, called the root, which is the target of no arrows, and where all other elements are the target of precisely one arrow. It is a mathematical theorem that in a tree, there exists one and only one path from the root to any of the other elements of the tree.

A partial order, is a mathematical relation, <, over a set, S, such that for any three elements in S, E1, E2 and E3, the following propositions are true: “~(E1<E1)”, “E1<E2⇒~(E2<E1)” and “E1<E2^ E2<E3⇒E1<E3”. The “~” is logical negation, the “⇒” is logical implication and the “^” is logical conjunction. The order is “partial” when there may exist elements, E1 and E2 such that “~(E1<E2)^~(E2<E1)”. It is a theorem that from any DAG can be constructed one and only one partial order, <, by defining that for any pair of elements, E1 and E2 in the DAG, “E1<E2” is true if and only if there exists a path in the DAG from E1 to E2.

A “topological sorting” of a DAG is any list of all the elements of the DAG such that if some element, E1, appears before some other element, E2, in the list, then it is false that “E2>E1” by the partial order defined by the DAG. A topological sorting of a DAG may not be unique, because if for two elements E1 and E2 it is true that “~(E1<E2)^~(E2<E1)” then E1 may appear both before and after E2 in a topological sorting of the DAG.

An algorithm that is guaranteed to execute in a time that is not worse than proportional to some measure of the size of the input to the algorithm is called a “linear-time” algorithm.

An algorithm that can create a topological sorting given any DAG is called a “topological sorting algorithm”. A useful topological sorting algorithm is one that, if applied to a directed graph containing cycles, terminates with an indication that a topological sorting cannot be created. It has been mathematically proven that the best useful topological sorting algorithms are linear-time in the sum of the number of elements and arrows in the DAG.

In a directed graph, a set of elements that are part of a cycle is called a “strongly connected component”. An algorithm that can identify strongly connected components given any directed graph is called a “strongly connected components algorithm”. It has been mathematically proven that the best strong components algorithms are linear-time in the sum of the number of elements and arrows in the directed graph. Several linear-time, strong components algorithms are known. Some such algorithms, including “Tarjan's Strongly Connected Components Algorithm”, simply referred to as “Tarjan's algorithm”, are also topological sorting algorithms if the graph given to the algorithm is a DAG. Below, when referring to “topological sorting” it is implied that the algorithm is both a topological sorting and a closely connected components algorithm, or some combination of both, unless otherwise stated.

Figure 2A:
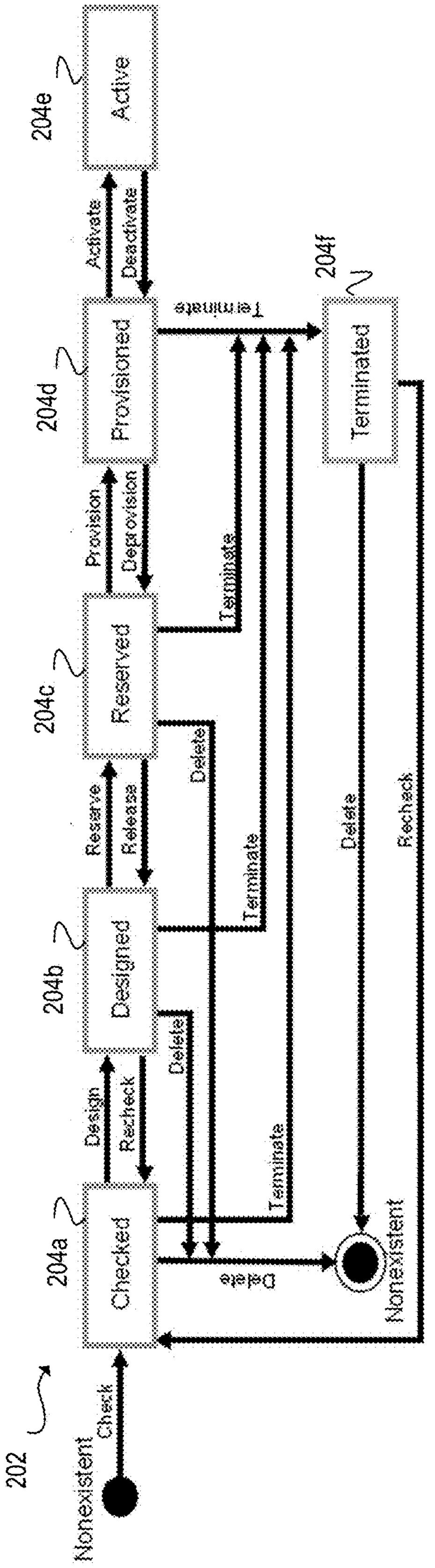
FIG. 2A represents an example state model that includes a service and different types of relationships to other services in accordance with the present disclosure.

A “finite state machine” or in this context, simply a “state machine” is a well-known concept in computer science. A state machine consists of a finite set of states, a set of transition names, an identified start-state among the states, a set of identified end-states, and a partial state-transition function that given a state and a transition name may compute a new state. The transition function should not be defined for any of the end-states. A state-machine can be modeled as a directed graph, where each of the arrows represent the input and output states of the state-transition function, and the arrow is labeled by a transition name. FIG. 2A shows an example of the graph of a state machine, where the start and end states are marked “Nonexistent” and the end-state is identified by a circled dot. The remaining states are in rectangular boxes and the transition names are shown as labels on the arrows. The example of FIG. 2A shows a state machine known as the MTOSI state model standardized by the international organization named TeleManagement Forum.

Certain examples described herein provide measures for developing an orchestration plan from a directed service graph. A service graph comprises a collection of services, subservices and physical or virtual components used to construct those services. In particular, the service graph defines relationships between those services and subservices, represented as an acyclic directed graph.

The foregoing disclosure describes a number of example implementations for determining a sequence of actions to perform based on a modification to a service in a graph. The disclosed examples may include systems, devices, computer-readable storage media, and methods for detecting the member suffering the soft failure. For purposes of explanation, certain examples are described with reference to the components illustrated in FIGS. 1-8. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

FIG. 1 illustrates an example system including processor 102 coupled to modeler 104 and planner 108. Modeler 104 builds model 106 that represents a set of services and relationships that exist between the services. Using model 106, planner 108 Model 106 is used as input to planner 108 to apply dependency rules 110 to the different types of relationship. The application of dependency rules creates inter-service dependencies 112 between service transitions of the set of services as illustrated in representation 112. Creating inter-service dependencies as in representations 112, planner 108 develops orchestration plan 114 that includes a sequenced order of state transitions in which to execute so the system remains stable. The system in FIG. 1 includes processor 102 that is coupled to modeler 104 and planner 108 to develop orchestration plan 114. Implementations of processor 102 may include a virtual device, or physical device such as electronic circuitry (i.e., hardware) that includes an integrated circuit, programmable circuit, application integrated circuit (ASIC), controller, processor, semiconductor, processing resource, chipset, or other type of component capable of managing the system in FIG. 1.

Modeler 104 builds model 106 to represent the interconnectedness between the set of services. Model 106 includes nodes (rectangular shape) that each represent a different service. In this example, eleven different services are illustrated at each node. Each service within the set of service are inter-related by different types of relationships. These different types of relationships are illustrated in a hierarchical structure and dotted lines. Examples of the different types of relationships may include a parent relationship, child relationship, sibling relationship, reference relationship, resource relations, referral relationship, prerequisite relationships among others. These different types of relationships may be explained in detail in later figures. Implementations of modeler 104 include electronic circuitry (i.e., hardware) such as an integrated circuit, programmable circuit, application integrated circuit (ASIC), controller, processor, semiconductor, processing resource, chipset, or other type of hardware component capable of building model 106. Alternatively, modeler may include instructions (e.g., stored on a machine-readable medium) that, when executed by processor 102 builds model 106. Implementations of model 106 include state model, a multi-technology operations system interface (MTOSI) model, conception model, mathematical model, computer model, or other type of model that illustrates the inter-connectedness of the set of services to each other by the different types of relationships.

Planner 108 uses model 106 as build by modeler 104 to apply dependency rules 110 to create inter-service dependencies are illustrated in representation 112. Based on the creation of the inter-service dependencies, planner 108 may proceed to develop orchestration plan 114. In this implementation, planner 108 may develop a directed graph (not illustrated) prior to development of orchestration plan 114. Planner 108 may apply an application to the directed graph to obtain the sequenced order of state transitions as in orchestration plan 114. Implementations of planner 108 include electronic circuitry (i.e., hardware) such as an integrated circuit, programmable circuit, application integrated circuit (ASIC), controller, processor, semiconductor, processing resource, chipset, or other type of hardware component capable of developing orchestration plan 114. Alternatively, planner 108 may include instructions (e.g., stored on a machine-readable medium) that, when executed by processor 102 develops orchestration plan 114.

Dependency rules 110 apply the different types of relationships as created in model 106. For example, a set of dependency rules may apply to parent type of relationships, another set of dependency rules apply to child type of relationships, yet another set of dependency rules apply to sibling type of relationship. The application of dependency rules 110 by planner 108 results in inter-service dependencies among state transitions for the set of services as seen in representation 112. To produce the inter-service dependencies for the state transitions, dependency rules 110 are a set of principles that govern the state transitions for the different types of relationships within the system in FIG. 1. Providing government of the state transitions, dependencies are created among the state transitions for the set of services. Explicit examples of dependency rules 110 may be explained in detail in a later figure.

Representation 112 is a visual depiction that illustrates inter-service dependencies among state transitions for the set of services. As explained earlier, the inter-service dependencies are created based on the application of dependency rules 110. Although representation 112 is illustrated as visual rendering, implementations should be limited as this was done for illustration purposes. For example, representation 112 may be produced by planner 108 without a visual rendering. Rather, representation 112 was illustrated for purposes of understanding the inter-service dependencies. These inter-service dependencies may be illustrated in a later figure.

Orchestration plan 114 is produced by planner 108 upon creation of the inter-service dependencies. Orchestration plan 114 lists the sequenced order of the state transitions for the system to keep the system in FIG. 1 in a consistent state without interruption or downtime. In one implementation, orchestration plan 114 is developed from a directed graph. In this example, planner 108 applies a linear-time algorithm that provides a topological sorting for the state transitions for the set of services. As such, orchestration plan 114 prioritizes the state transitions for the set of services.

In this manner, orchestration plan 114 provides an automated sequenced order of the state transitions for the set of services. The sequenced order of state transitions provides a listed order of actions that should be performed to keep in the consistent state. In a further implementation, the sequenced order of the state transitions may be executed in the order listed by orchestration plan 114. This implementation may be explained in detail in later figures.

Figure 2B:
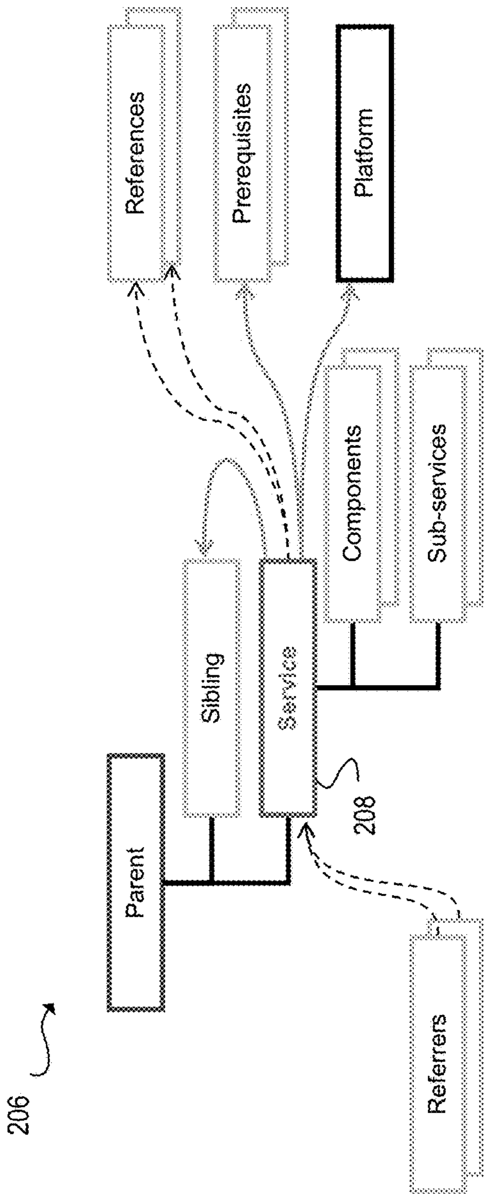
FIG. 2B represents an example service with possible state transitions and inter-service dependencies to another service in accordance with the present disclosure.
Figure 2C:
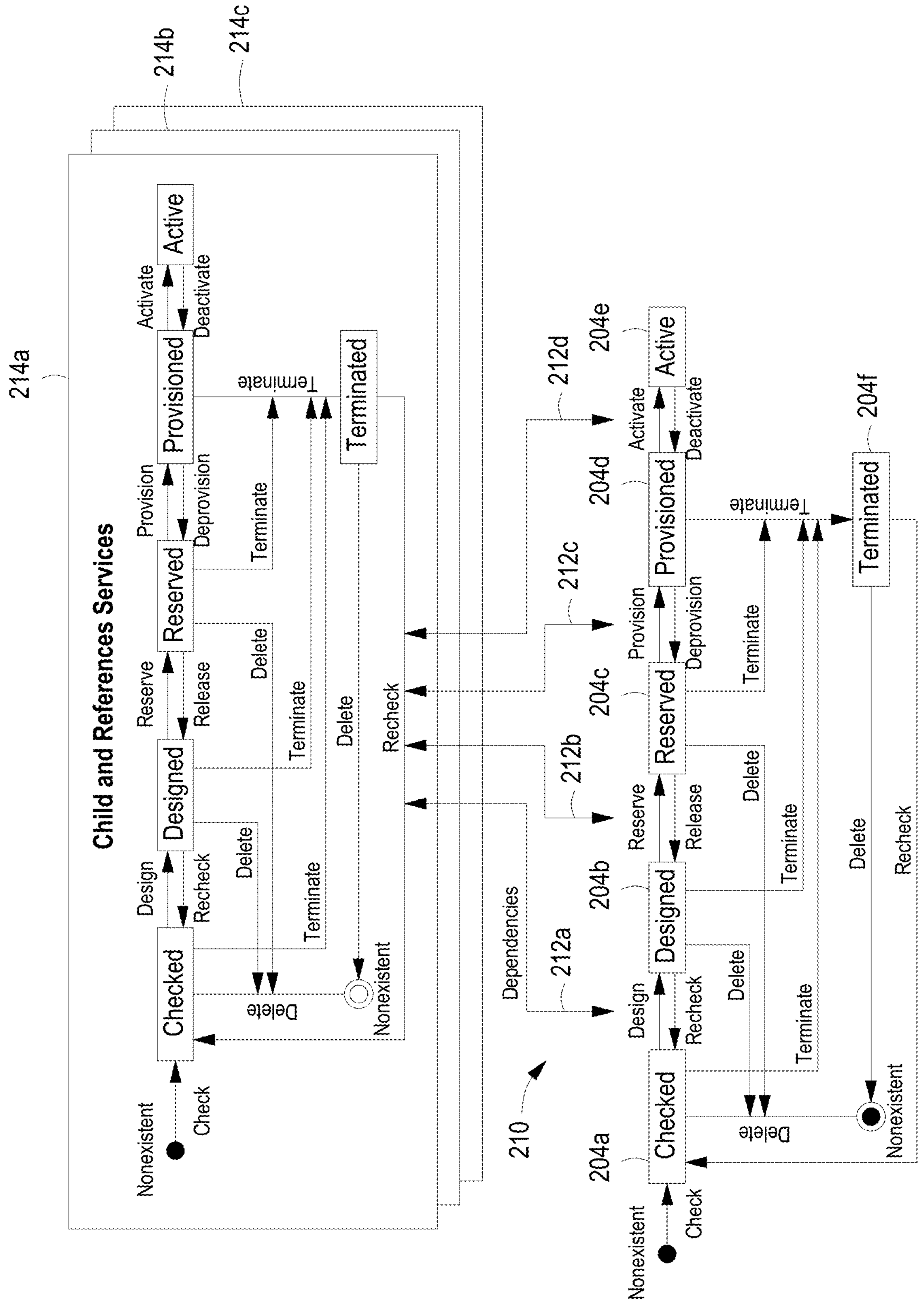
FIG. 2C represents an example service with possible state transitions and inter-service dependencies to other services.

FIGS. 2A-2C illustrate various models for a given service that are used to represent state transitions, different types of relations to other services, and creation of inter-service dependencies. As such, the discussion for FIGS. 2A-2C are given from a perspective for the given service within the set of services. For purposes of discussion, the components illustrated in these figures may be used interchangeably throughout the discussion of each of the figures. For example, FIG. 2A represents a state model for a given service, FIG. 2B represents how that given service relates to other services via different types of relationships, while FIG. 2C represents the inter-service dependencies for that given service and other services.

Referring now to FIG. 2A, an example state model 202 illustrates potential state transitions **204*a*-204*e* for a given service 208 as in FIG. 2B. State model 202 is represented as a multi-technology operations system interface (MTOSI) model that includes initial state transition 204*a* and potential state transitions 204*b*-204*f*. The MTOSI model may be used by service providers as a mechanism to manage many of the complex networks and corresponding services. Although FIG. 2A illustrates state model 202 as the MTOSI model, implementations should not be limited as this was done for illustration purposes. For example, state model 202 may include a conceptual model or other visual depiction representing various states of given service 208. State model 202 provides a visual depiction of the inter-relatedness of the set of services by rendering possible state transitions 204*a*-204*f***.

FIG. 2B represents an example service 208 with different types of relationships (e.g., parent, sibling, referrers, references, prerequisites, etc.). The arrows indicate the relationship of given service 208 to those other services. For example, there is a parent service to given service 108, while another service is a sibling to given service 208. The model is developed as in FIG. 2A that also includes the different types of relationships between given service 208 and other services. Depending on the type of relationship, a set of dependency rules may be applied to the different types of relationships to create inter-service dependencies as illustrated in FIG. 2C.

FIG. 2C represents an example service with possible state transitions **204*a*-204*e* and inter-service dependencies 212*a*-212*d* to other services 214*a*-214*c*. In this example, based on building state model 202 as in FIG. 2A, planner 108 as in FIG. 1 applies a set of dependency rules to different types of relationships. The application of the dependency rules create inter-service dependencies 212*a*-212*d*. Inter-service dependencies 212*a*-212*d* are those dependencies created from the application of the set of dependency rules. These inter-service dependencies 212*a*-212*d* are those dependencies that exist between state transitions between the services. For example, assume the set of dependency rules relate to state transitions the given service to child and referenced services 214*a*-214*c*. In this example, the given service transition from state "checked" 204*a* to "designed" 204*b* creates inter-service dependency 212*a* that depends on a state transition (not illustrated) in other service 214***a*. In another example, the given state transition from "designed" 204*b* into "reserved" 204 has dependence 212*b* to other state transition (not illustrated) in other service 214*a*. Yet, in another example, state transition from "reserved" 204*c* into "provisioned" 204*d* has inter-service dependency 212*c* to state transition corresponding to other service 214*a*. In one more example, state transition for the given service from "provisioned" 204*d* into "active" 204*e* has inter-service dependency 212*d* to state transition corresponding to other service 214*a*. The set of dependency rules may be explained in detail in later figures.

Figure 3:
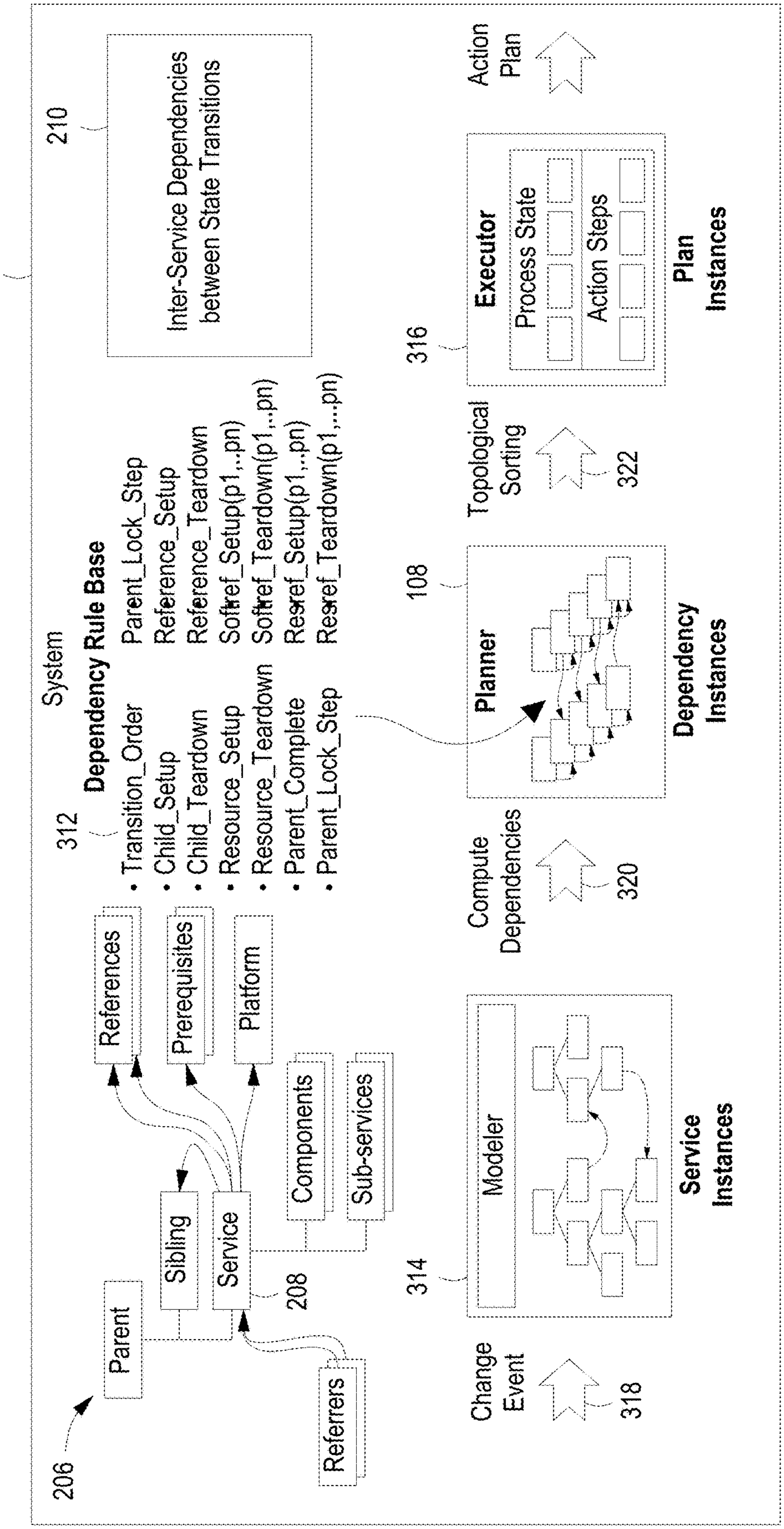
FIG. 3 illustrates an example system architecture from a state model to a creation of inter-service dependencies and an orchestration plan listing an ordered sequence of state transitions for execution in accordance with the present disclosure.

FIG. 3 illustrates an example system architecture to develop an orchestration plan of state transitions for a set of services for execution by executor 316. Using model 206 that shows how service 208 relates to other services via different types of relationships (e.g., parent, sibling, child, referrer, pre-requisite, references, etc.). Impact model 314 may develop model 216 that is used by planner 108. Planner 108 applies dependency rules 312 which are specific to the different types of relationships. By applying dependency rules 312, planner 108 creates inter-service dependencies between the given service and other services as represented by 210. Creating the inter-service dependencies, planner 108 obtains a directed graph (not illustrated). Examples of the directed graph are discussed in later figures. Using the directed graph, planner 108 may apply a topological sorting algorithm 322 to obtain a list of state transitions for execution by 316. The list of state transitions is developed by the orchestration plan (not illustrated). The orchestration plan includes the sequenced order of state transitions for execution. Implementations of the directed graph and orchestration plan may be explained in detail in later figures. Implementations of components 314 and 316 include electronic circuitry (i.e., hardware) such as an integrated circuit, programmable circuit, application integrated circuit (ASIC), controller, processor, semiconductor, processing resource, chipset, or other type of hardware component capable of building model 206 and developing the list of state transitions in which to execute. Alternatively, components 314 and 316 may include instructions (e.g., stored on a machine-readable medium) that, when executed by a hardware component (e.g., controller and/or processor) builds a model and develops the sequenced order of state transitions, accordingly.

Figure 4B:
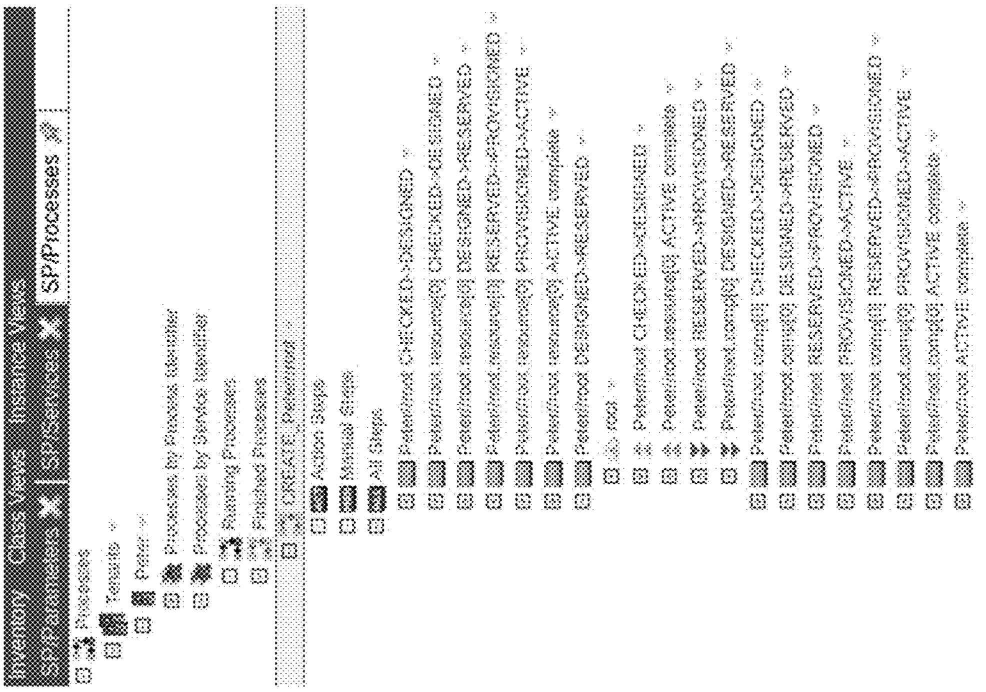
FIG. 4B illustrates an example orchestration plan that is developed from a directed graph in accordance with the present disclosure.
Figure 4A:
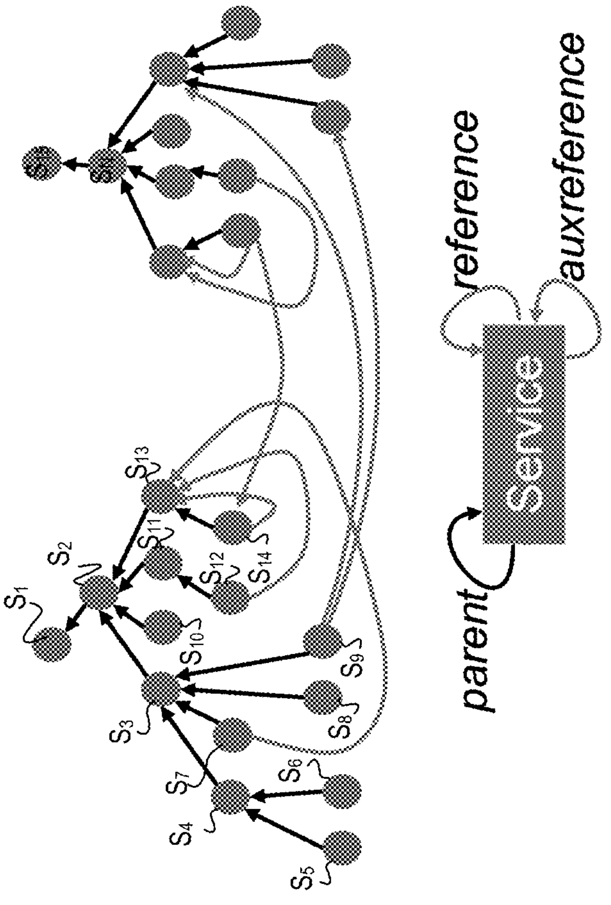
FIG. 4A illustrates an example directed graph from which to develop an orchestration plan in accordance with the present disclosure.

FIGS. 4A-4B represent directed graph 402 that may be obtained from system 302 as in FIG. 3. Using directed graph 402, planner 108 develops orchestration plan 404 that lists a sequenced order state transitions for a set of services.

Referring now to FIG. 4A, directed graph 402 illustrates nodes that represents state transitions for corresponding services $S_1$-$S_{25}$. Directed graph 402 shows the interconnectedness between the state transitions corresponding services $S_1$-$S_{25}$. The directed graph 402 may be obtained based on the inter-service dependencies as illustrated in FIG. 2C. Each node represented on directed graph 410 represents a different service among the set of services and the corresponding state transition. In this example, there are twenty five different services and dependencies among the state transitions of the services.

FIG. 4B illustrates an example orchestration plan 404 that is developed from directed graph 402 in accordance with the present disclosure. Using directed graph 402, planner 108 applies a linear-time algorithm that provides a topological sorting for the state transitions for set of services ($S_1$, $S_2$, $S_3$, $S_4$, $S_5$, $S_6$, $S_7$, . . . , $S_{25}$, etc.). In one implementation, the linear-time algorithm executable by planner 108 may include Tarjan's algorithm to prioritize the state transitions for the set of services. This orchestration plan 404 provides an automated sequenced order of the state transitions for the set of services. The sequenced order of state transitions provides a listed order of actions that should be performed to keep a system in a consistent state without interruption or downtime. As illustrated in FIG. 4B, the state transitions steps are listed that have been or which will be executed. For a given service state transition, state transitions which have been executed may depend on subsequent state transitions and on the dependency rules applied for the type of relationships for that given service. In this example, the "action steps" show a condensed view of those state transitions. Accordingly, orchestration plan 404 is a sequenced of state transitions for the set of service based on physical devices, virtual devices, and configurations that brings through a sequenced order of configurations of service state in response to a request to achieve a specified end goal services achieved by collaboration by the devices and applications.

Figure 5:
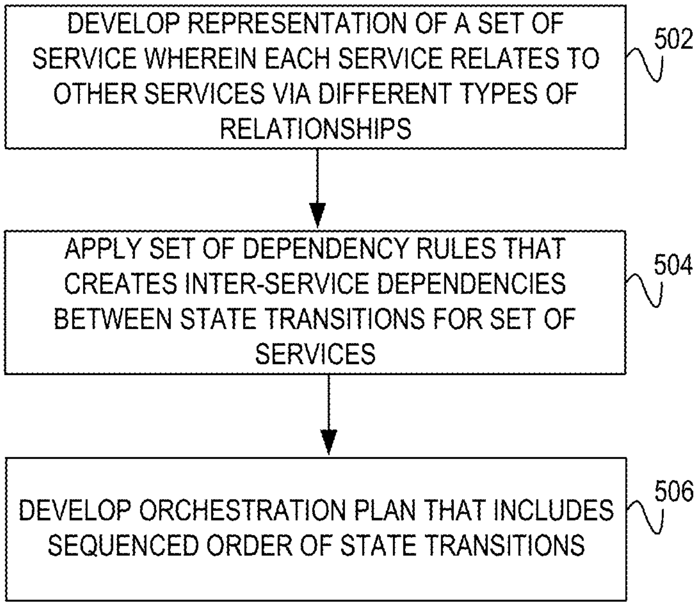
FIG. 5 illustrates a flow diagram executable by a computing device to develop an orchestration plan that includes a sequenced order of state transitions for a set of services in accordance with the present disclosure.
Figure 6:
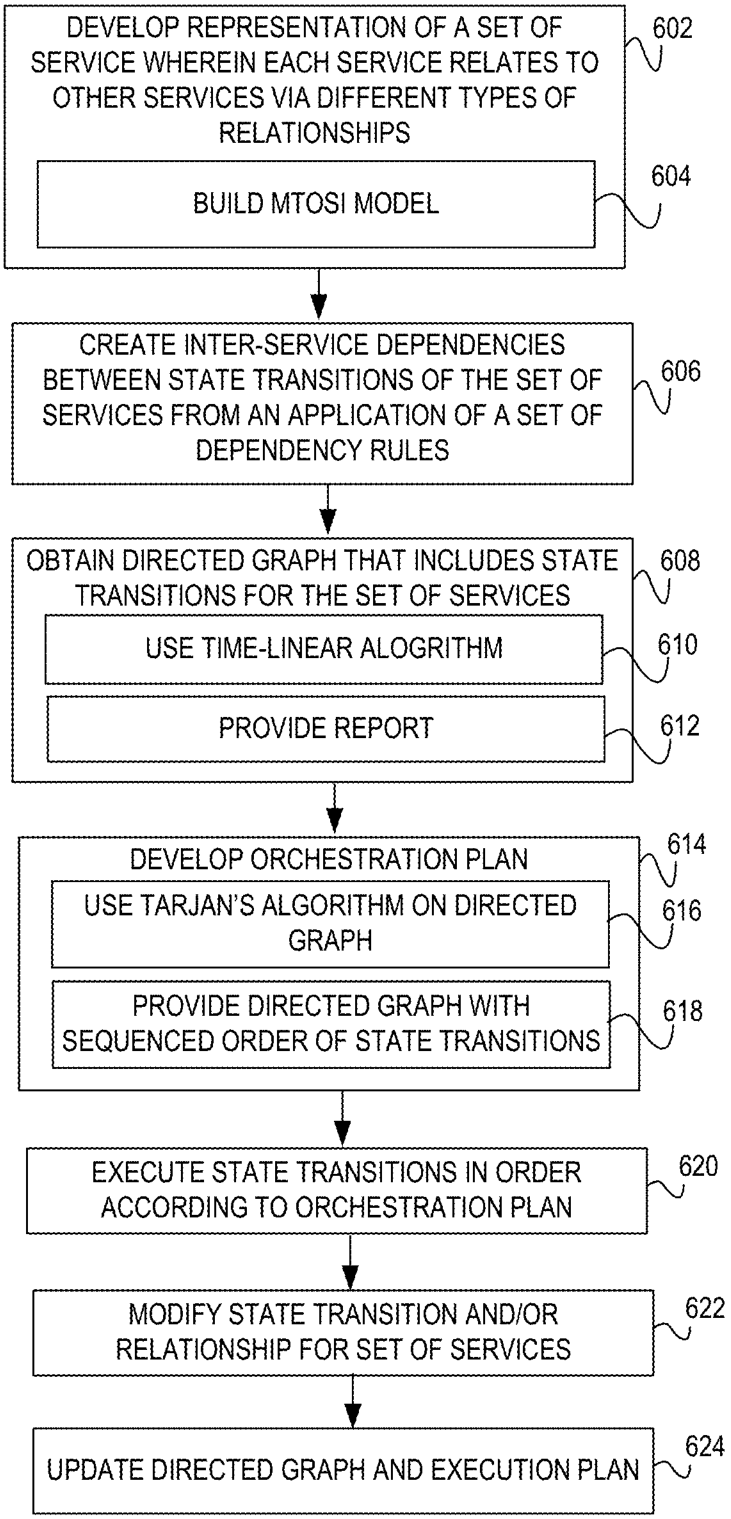
FIG. 6 illustrates a flow diagram executable by a computing device to obtain a directed graph and from the directed graph, develop an orchestration plan that includes a sequenced order of state transitions for a set of services in accordance with the present disclosure.

Referring now to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 5-6 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 5 illustrates a flow diagram executable by a computing device to develop an orchestration plan that includes a sequenced order of state transitions for a set of services. The computing device may initially develop a representation for the set of services. In the representations, each service within the set of services relates to other services by types of relationships (e.g., parent, sibling, etc.). As such, creating the representation, the computing device proceeds to apply a set of dependency rules to the types of relationships. Examples of the set of dependency rules are explained in detail with the discussion of operation 504. Applying the set of dependency rules for the different types of relationships, creates inter-service dependencies. Inter-service dependencies are those dependencies that exist between state transitions for the set of services. Based on creating the inter-service dependencies, the computing device may obtain a directed graph at which each node represents the state transition for each service. From the directed graph, the computing device develops the orchestration plan. The orchestration plan lists the sequenced order of the state transitions for the set of services. In discussing FIG. 5, references may be made to the components in FIGS. 1-4 to provide contextual examples. In one implementation, planner 108 and 208 as in FIGS. 1-2 executes operations 502-506 to develop the orchestration plan. In another implementation, a processing resource (not illustrated) executes operations 502-508. Although FIG. 5 is described as implemented by the computing device, it may be executable on other suitable hardware components. For example, FIG. 5 may be implemented in the form of executable instructions on a machine-readable storage medium 704 and 604 as in FIGS. 7-8.

At operation 502, the computing device develops the representation of the set of services. At this operation, each service is modeled as related to other services by different types of relationships. In one implementation, the computing device may build a MTOSI model as input. The MTOSI model provides a representation of how each service relates to other service through types of relationships. The types of relationships include for example, a parent relationship, a child relationship, a referral relationship, a pre-requisite relationship among others. Building a model, the computing device represents the type of relationship for each service to other services which illustrates how each service relates to one another.

At operation 504, the computing device applies dependency rules that creates inter-service dependencies between state transitions for the set of services. The set of dependency rules may depend on the type of relationship between a given service and other services. Examples of the set of dependency rules may be possible to view state transitions that should be executed before and after a given dependency rule. This provides an indication of the set of dependency rules that may have caused the dependency between state transitions of the services. Although an example of the dependency rules are listed below, implementations should be so limiting as this was done for illustration purposes. Accordingly, there may be additional dependency rules or fewer dependency rules not listed below. For example, the set of dependency rules as grouped according to the type of relationship. For example, for a child type of relationship the dependency rules may include the following:

CHILD_SETUP—A child service/component must wait for its parent to reach a given MTOSI state before the child can be set-up to the same MTOSI state.

CHILD_TEARDOWN—Parent services must wait to be torn down to any given MTOSI state until their child components/services are at most at that state first.

RESOURCE_TEARDOWN—The resource child must wait for parent to be TERMINATED before being torn down.

In another example, for the parent relationship the dependency rules may include the following:

PARENT_COMPLETE—The parent needs to wait for its children to be complete, before the parent itself is marked as complete. Note that the meaning of "complete" depends on the desired state of the service.

PARENT_LOCK_STEP—If the lockstep: true option is defined in the descriptor, then the parent setup progression is waiting for the child state to be progressed lockstep according to the MTOSI state model, so that the parent state is never more than one state ahead of the child state.

PARENT_LOCK_STEP_TEARDOWN—If the lockstep: true option is defined in the descriptor, then the parent teardown progression is waiting for the child state to be progressed lockstep according to the MTOSI state model, so that the parent state is never more than one state higher than the child state.

RESOURCE_SETUP—A parent service must wait for resources to be ACTIVE, before the parent becomes DESIGNED In yet another example, for the reference relationship the dependency rules may include the following:

REFERENCE_SETUP—The service should wait for its reference to reach its desired state (typically ACTIVE) before progressing to RESERVED state.

REFERENCE_TEARDOWN—The referenced service cannot be automatically torn down until its last referrers have been torn down. Also, if the last referrer changes its reference parameter to a different service, there may be a shadow version still holding on to the old reference. So the teardown of the referenced service must wait until the shadow version is removed.

SOFTREF_SETUP(p1, p2, . . . , pn)—When a prerequisite parameter (other than reference and auxreference) references a service, then the state of the referrer must stay behind the state of the referenced service during setup. Note that this is different from REFERENCE_SETUP because the referenced service is not forced to become ACTIVE before the referrer; the referrer only needs to be in a lower MTOSI state.

The dependency lists the names of the parameter(s) that created the dependency—so these parameters are likely candidates for a prerequisite: false annotation.

SOFTREF_TEARDOWN(p1, p2, . . . , pn)—Same as SOFTREF_SETUP, but for preventing teardown of the referenced service.

REFERENCE_LOCKSTEP—Like SOFTREF_SETUP, but holding back the state of the referenced service to stay at most one MTOSI state ahead of the referrer service. Similar to REFERENCE_TEARDOWN, but holding back the state of the referenced service to stay at most one MTOSI state larger than the state of the referrer service.

RESREF_SETUP(p1, p2, . . . , pn)—This works like softreferences, but this rule is generated instead of SOFTREF_SETUP when a parameter is specified with prerequisite: resource. With this rule, the services referenced by the listed parameters must be taken to their desired state even before the current service becomes DESIGNED. So it is like REFERENCE_SETUP, but it works for any parameter and is even more restrictive. In release 2.2.1 the prerequisite: resource annotation does not work for parameters reference and auxreference.

RESREF_TEARDOWN(p1, p2, . . . , pn)—Same as RESREF_SETUP, but for preventing early teardown of the referenced service.

TRANSITION_ORDER—The sequence of state-transitions defined by the MTOSI state model.

At operation 506, the computing device develops the orchestration plan that includes the sequenced order of state transitions for the set of services. In an implementation, based on applying the set of dependency rules for the different types of relations, inter-service dependencies are created between the state transitions. Based on the inter-service dependencies, the computing device computes the directed graph that includes a node for each service and state transition for its respective service. From the directed graph, the computing device may proceed to develop the orchestration plan. The orchestration plan lists the sequenced order of state transitions. This means that each state transition is illustrated to indicate which service state transitions should be executed before other service state transitions. In a further implementation, one of the relationships may be modified and/or state transitions of the service. In this implementation, the directed graph and the orchestration plan are updated to reflect the modification.

FIG. 6 illustrates a flow diagram executable by a computing device to obtain a directed graph from which to develop an orchestration plan that includes a sequenced order of state transitions for a set of services. In discussing FIG. 6, references may be made to the components in FIGS. 1-4 to provide contextual examples. In one implementation, planner 108 and 208 as in FIGS. 1-2 executes operations 602-624 to develop the orchestration plan. In another implementation, a processing resource (not illustrated) executes operations 602-624. Although FIG. 6 is described as implemented by the computing device, it may be executable on other suitable hardware components. For example, FIG. 6 may be implemented in the form of executable instructions on a machine-readable storage medium 704 and 804 as in FIGS. 7-8.

At operation 602, the computing device develops a representation of the set of services. The representation is a model that depicts how each service relates to other services via different types of relationships (e.g., parent, child, sibling, etc.). Through these different types of relationships, the model illustrates the interconnectedness of each services to other services within the set of services. In one implementation, the computing device builds a multi-technology operations system interface (MTOSI) model as at operation 604. Operation 602 may be similar in functionality to operation 502 as in FIG. 5.

At operation 604, the computing device builds the MTOSI model. Building the MTOSI model, is a visual representation that represents an initial state and possible state transitions for each service within the set of services. The MTOSI model which implements interfaces between operation support systems (OSSs). MTOSI models may be used by service providers to manage complex networks. In this manner, since various parts of the network interact, the MTOSI model implements the corresponding OSSs. The MTOSI model provides a visual depiction of the interrelatedness between each of the services within the set services. Based on building the MTOSI model, the computing device proceeds to apply a set of dependency rules to the different types of relationships as at operation 606.

At operation 606, the computing device creates inter-service dependencies between state transitions corresponding to the various services within the set of services. In this implementation, the set of dependency rules are applied to the different types of relationships between the services. Upon application of the set of dependency rules, this creates inter-service dependencies between the state transitions for each of the services within the set of services. Examples of the dependency rules as grouped according to the types of relationships are explained in detail in accordance with the previous figures. Operation 606 may be similar in functionality to operation 504 as in FIG. 5.

At operation 608, the computing device obtains the directed graph. Within the directed graph, each node represents the state transition that corresponds to each given service within the set of services. As explained earlier in FIGS. 1-4, the directed graph is a set of objects, referred to as nodes, which are connected to one another. The edges of the graph are directed from one node to another. As such, the nodes of the graph represents each of the state transitions for the set of services. In this manner, the directed graph provides a visual depiction of those state transitions for the set of services. In one implementation, if the directed graph is a cyclic graph, the computing device may proceed to apply a linear-time program to detect closely connected components within the directed graph as at operation 610. In response, the computing device provides a report to identify those closely connected components which should change (e.g., state transition and/or relationship) so that the directed graph becomes an acyclic graph as at operation 610.

At operations 610-612, the computing device uses a linear-time algorithm executable by the computing device to detect the closely connected components in the directed graph. In this implementation, the directed graph may be represented as a cyclic graph. The cyclic graph contains at least one graph cycle. As such, the cyclic graph may possess one undirected simple cycle. As such to accommodate the more complex services and dependencies, an acyclic graph may be more desirable to account for the more complex system. In this implementation, the computing device uses the linear-time algorithm to detect the closely connected components in the directed graph. In response to executing the linear-time algorithm, the computing device proves a report or notification of the detected closely components. This report provides a notification to an administrator which relationships in the set of services should be modified so that the directed graph becomes the acyclic graph. The acyclic graph are considered bipartite graphs that have no graph cycles and as such may accommodate more complex systems and services.

At operation 614, the computing device develops the orchestration plan from the directed graph obtained at operation 608. The orchestration plan includes the sequenced order of state transitions for the set of services. This means the orchestration plan lists the order of state transitions that computing device should execute to prevent conflicting state transitions among the set of services. In one implementation, based upon obtaining the directed graph, the computing device proceeds to apply Tarjan's algorithm to sort the state transitions as at operation 616. In response to applying Tarjan's algorithm, means that the directed graph may include the sequenced order of state transitions as developed as part of the orchestration plan. In response to developing the orchestration plan, the computing device proceeds to execute the listed state transitions in the order listed on the orchestration as at operation 620. Operation 614 may be similar in functionality to operation 506 as in FIG. 5.

At operations 616-618 using the directed graph obtained at operation 608, the computing device applies Tarjan's algorithm to sort the state transitions to provide the sequenced order of state transitions. Tarjan's strongly connected components algorithm as executed by the computing device takes the directed graph as input and produces a partition of the graph's nodes into the graph's strong connected components. As such, Tarjan's algorithm operation provides a topological sorting of the directed graph so that the state transitions depicted within the directed graph are prioritized. Based on the application of Tarjan's algorithm to the directed graph, the state transitions are provided in a logical sequenced order for the computing device to execute as at operation 620. In an implementation, operations 616-618 may be executed as alternative to operations 610-612. In other implementations, operation 616-618 are executed in conjunction to operations 610-612.

At operation 620, the computing device proceeds to execute each of the state transitions for the set of services. The computing device executes the state transitions as specified in the orchestration plan, in the sequenced order provided by the orchestration plan. This means the computing device executes the state transitions in the order provided by the orchestration plan. Executing the sequenced order of the state transitions prevents conflicting state transitions that may occur with the set of services.

At operation 622, the computing device may modify one of the state transitions within the set of services and/or one of the relationships within the model. In response to this modification, modifications to other services may be cascaded throughout the set of services. In turn, the computing device updates the directed graph and the orchestration plan accordingly as at operation 624.

At operation 624, in response to modifying one of the state transitions and/or relationships, the computing device provides the updated directed graph. From the updated graph that includes the possible state transitions, the computing device develops the updated orchestration plan. The updated orchestration plan includes the updated sequence of order of the state transitions within the set of services. Based on the updated orchestration plan, the computing device may proceed to execute the updated state transitions.

Figure 7:
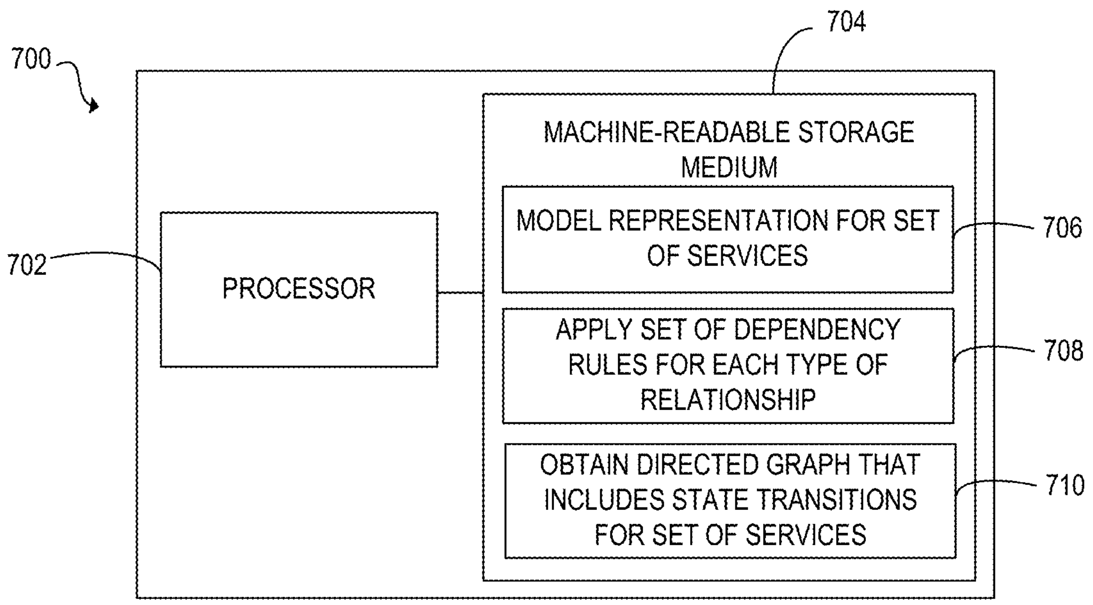
FIG. 7 is a block diagram of an example computing device with a processing resource to execute instructions in a machine-readable storage medium to obtain a directed graph representing a state transition for each service within a set of services in accordance with the present disclosure.
Figure 8:
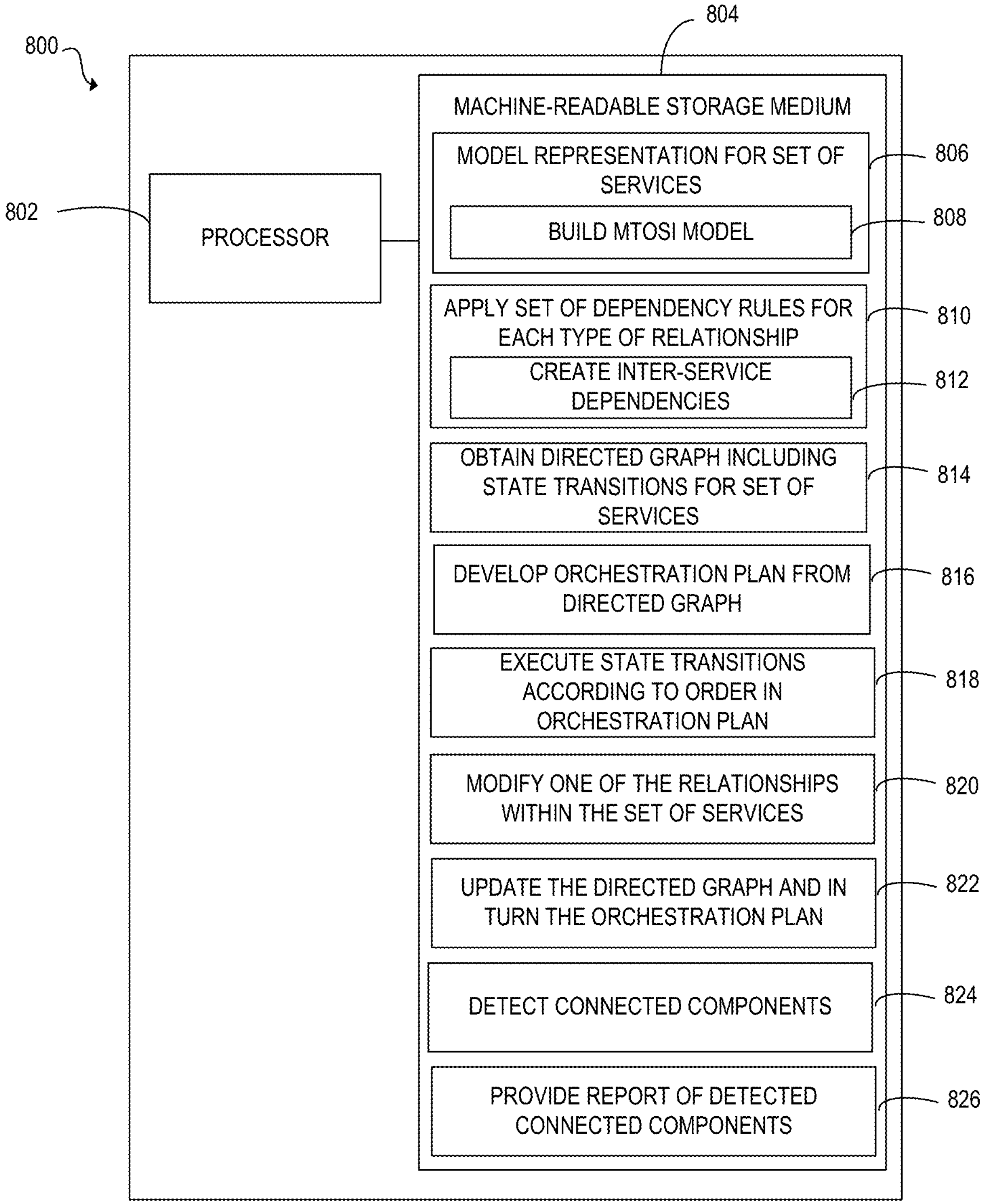
FIG. 8 is a block diagram of an example computing device with a processing resource to execute instructions in a machine-readable storage medium to develop, from a directed graph, an orchestration plan that includes a sequenced order of state transitions for a set of services in accordance with the present disclosure.

Referring now to FIGS. 7-8, example block diagrams of computing devices 700 and 800 with processing resources 702 and 802 are illustrated to execute machine-readable instructions in accordance with various examples of the present disclosure. The machine-readable instructions represent instructions that may be fetched, decoded, and/or executed by respective processing resources 702 and 802. While illustrated in a particular order, these instructions are not intended to be so limited. Rather, it is expressly contemplated that various instructions may occur in different orders and/or simultaneously with other instructions than those illustrated in FIGS. 7-8.

FIG. 7 is a block diagram of computing device 700 with processing resource 702 to execute instructions 706-710 within machine-readable storage medium 704. Although computing device 700 includes processing resource 702 and machine-readable storage medium 704, it may also include other components that would be suitable to one skilled in the art. For example, computing device 700 may include a controller, memory storage, or other suitable type of component. The computing device 700 is an electronic device with processing resource 702 capable of executing instructions 706-710 and as such embodiments of the computing device 700 include a networking device such as a server, switch, router, wireless access point (WAP), or other type of networking device. Other embodiments of the computing device 700 include an electronic device such as a laptop, personal computer, mobile device, or other type of electronic device capable of executing instructions 706-710. The instructions 706-710 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processing resource 702 may fetch, decode, and execute instructions 706-710 obtain the directed graph representing state transitions for the set of services. Specifically, the processing resource 702 executes instructions 706-710 to: model a representation for a set of services, wherein each service relates to other services via different types of relationships (e.g., parent, child, reference, referral, etc.); apply a set of dependency rules for each type of relationship based on the modeled representation that creates inter-service dependencies between the state transitions for the set of services; and obtain a directed graph from the inter-service dependencies, wherein each node within the directed graph represents a state transition for each service within the set of services.

The machine-readable storage medium 704 includes instructions 706-710 for the processing resource 702 to fetch, decode, and execute. In another embodiment, the machine-readable storage medium 704 may be an electronic, magnetic, optical, memory, storage, flash-drive, or other physical device that contains or stores executable instructions. Thus, machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 704 may include an application and/or firmware which can be utilized independently and/or in conjunction with processing resource 702 to fetch, decode, and/or execute instructions of machine-readable storage medium 704. The application and/or firmware may be stored on machine-readable storage medium 704 and/or stored on another location of networking device 700.

FIG. 8 is a block diagram of computing device 800 with processing resource 802 to execute instructions 806-826 within machine-readable storage medium 804. Specifically, the computing device 800 with processing resource 802 executes instructions 806-826 to develop, from a directed graph, an orchestration plan that includes a sequenced order of state transitions for a set of services. Although computing device 800 includes processing resource 802 and machine-readable storage medium 804, it may also include other components that would be suitable to one skilled in the art. For example, computing device 800 may include a controller, memory storage, or other suitable type of component. The computing device 700 is an electronic device with processing resource 802 capable of executing instructions 806-826 and as such embodiments of the computing device 800 include a networking device such as a server, switch, router, wireless access point (WAP), or other type of networking device. Other embodiments of the computing device 800 include an electronic device such as a laptop, personal computer, mobile device, or other type of electronic device capable of executing instructions 806-826. The instructions 806-826 may be implemented as methods, functions, operations, and other processes implemented as machine-readable instructions stored on the storage medium 804, which may be non-transitory, such as hardware storage devices (e.g., random access memory (RAM), read only memory (ROM), erasable programmable ROM, electrically erasable ROM, hard drives, and flash memory).

The processing resource 802 may fetch, decode, and execute instructions 806-826 to develop an orchestration plan from a directed graph representing state transitions for the set of services. Specifically, the processing resource 802 executes instructions 806-826 to: model a representation for the set of services wherein each service is related to other services in the set of service via different types of relationships; build a MTOSI model as part of the representation that includes initial states for each service within the set of services and the possible state transitions for each service; apply a set of dependency rules for each type of relationship modeled such that the application of the dependency rules creates the inter-service dependencies the state transitions for the set of services; obtain the directed graph include the state transitions from the set of services; using the directed graph to develop the orchestration plan that includes a sequenced order of state transitions for the set of service via use of a linear-time topological sorting algorithm (e.g., Tarjan's); execute the state transitions for the set of services according to the sequenced order of state transitions provided in the orchestration plan; modify one of the types of relationships for one of services; in response to the modification, update the directed graph and in turn, the orchestration plan; detect connected components within the directed graph; and provide a report of the detected connected components that may be used to identify which relationships within the set of services should change so that the directed graph becomes an acyclic graph.

The machine-readable storage medium 804 includes instructions 806-826 for the processing resource 802 to fetch, decode, and execute. In another embodiment, the machine-readable storage medium 804 may be an electronic, magnetic, optical, memory, storage, flash-drive, or other physical device that contains or stores executable instructions. Thus, machine-readable storage medium 804 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 704 may include an application and/or firmware which can be utilized independently and/or in conjunction with processing resource 802 to fetch, decode, and/or execute instructions of machine-readable storage medium 804. The application and/or firmware may be stored on machine-readable storage medium 804 and/or stored on another location of networking device 800.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a computing device, the method comprising:

developing a representation of a set of services wherein each service relates to other services via different types of relationships, the representation comprising a state model providing a visual depiction of possible state transitions for each service of the set of services;

applying a set of dependency rules for each type of relationship within the set of services such that the application of the set of dependency rules creates inter-service dependencies between state transitions of the set of services;

obtaining a directed graph wherein each node within the directed graph represents a state transition of a different service;

based on the creation of the inter-service dependencies and the directed graph, developing an orchestration plan that includes a sequenced order of the state transitions for the set of services;

detecting closely connected components in the directed graph; and providing a report of the detected closely connected components, wherein the report identifies relationships in the set of services to change in order to modify the directed graph into an acyclic graph.

2. The method of claim 1, wherein a linear-time algorithm is used to detect the closely connected components.

3. The method of claim 1 comprising:

modifying one of the state transitions within the set of services; and based on the modified state transition, providing an updated orchestration plan that includes an updated sequence of order of the state transitions for the set of services.

4. The method of claim 1 wherein developing the representation for the set of services wherein each service relates to other services via different types of relationships comprises:

building a multi-technology operations system interface (MTOSI) model that represents an initial state and possible state transitions of each service.

5. The method of claim 1 wherein providing the orchestration plan that includes the sequenced order of the state transitions for the set of services comprises:

using Tarjan's Algorithm to provide a topological sorting of a directed graph that provides the sequence of order of the state transitions; and providing the directed graph with the identified sequence of the order of the state transitions.

6. The method of claim 1 comprising:

executing the state transitions for the set of services according to the sequenced order provided by the orchestration plan.

7. The method of claim 1 wherein the different types of relationships including a combination of at least one of the following: a parent relationship, a child relationship, a pre-requisite relationship, and a referral relationship.

8. A system to develop an orchestration execution plan, the system comprising:

a modeler, coupled to a planner, that develops a representation of each service as related to other services via different types of relationships; and the planner, coupled to the modeler and a processor, that:

applies a set of dependency rules for each type of relationship between each service and the other services;

based on the application of the set of dependency rules, creates inter-service dependencies between a state transition of each service and other state transitions of the other services;

develops a directed graph wherein each node within the directed graph represents the state transition for each service;

detects connected components in the directed graph, wherein the connected components identify which relationships to change in order to modify the directed graph to an acyclic graph; and based on the inter-service dependencies, develops an orchestration plan that lists a sequenced order of the state transition of each service and the other state transitions of the other services.

9. The system of claim 8 comprising:

an executor, coupled to the planner, that executes the state transition of the service and the other state transitions of the other services in the sequenced order provided by the orchestration plan.

10. The system of claim 9 wherein the planner further that:

modifies the state transition of the service; and based on the modified state transition, provides an updated execution plan that lists an updated sequenced order of the modified state transition of each service and the other state transitions.

11. The system of claim 8 wherein the modeler uses a MTOSI state model that develops the representation of each service as related to the other services.

12. The system of 11 wherein the planner develops the orchestration plan that lists of sequenced order of the state transitions for the set of services is to:

obtain a directed graph wherein each node within the directed graph represents a state transition for a different service; and using the directed graph, develop the orchestration plan.

13. A non-transitory machine-readable storage medium comprising instructions that when executed by a processing resource cause a computing device to:

model a representation for a set of services wherein each service relates to other services via different types of relationships;

in response to an application of a set of dependency rules for each type of relationship, create inter-service dependencies between state transitions for the set of services;

obtain a directed graph wherein each node within the directed graph represents a state transition for each service for the set of services; and detect connected components in the directed graph, wherein the connected components identify which relationships to change in order to modify the directed graph to an acyclic graph.

14. The non-transitory machine-readable storage medium of claim 13 comprising instructions that when executed by the processing resource cause the computing device to:

develop, from the directed graph, an orchestration plan that includes a sequenced order of state transitions for the set of services via utilization of a linear-time topological sorting algorithm.

15. The non-transitory machine-readable storage medium of claim 14 comprising instructions that when executed by the processing resource cause the computing device to:

execute the state transitions for the set of services according to the sequenced order provided by the orchestration plan.

16. The non-transitory machine-readable storage medium of claim 15 comprising instructions that when executed by the processing resource cause the computing device to:

modify one of the relationships within the set services; and in response to the modification, update the directed graph and the orchestration plan.

17. The non-transitory machine-readable storage medium of claim 13 wherein to model the representation for the set of services wherein each services relates to other services via different types of relationships comprises instructions that when executed by the processing resource causing the computing device to:

build a multi-technology operations system interface (MTOSI) model that represents an initial state and possible state transitions of each service.

18. The non-transitory machine-readable storage medium of claim 13 comprising instructions that when executed by the processing resource causing the computing device to:

provide a report of the detected connected components.

* * * * *